(12) United States Patent
Tsukuda (10) Patent No.: US 8,699,848 B2
(45) Date of Patent: Apr. 15, 2014

(54) VIDEO/AUDIO RECORDING AND REPRODUCING APPARATUS

(75) Inventor: Takuma Tsukuda, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 929 days.

(21) Appl. No.: 11/857,747

(22) Filed: Sep. 19, 2007

(65) Prior Publication Data

US 2008/0069543 A1 Mar. 20, 2008

(30) Foreign Application Priority Data

Sep. 19, 2006 (JP) ................................. 2006-252036

(51) Int. Cl.
*H04N 5/77* (2006.01)

(52) U.S. Cl.
USPC ........................................... 386/224; 386/210

(58) Field of Classification Search
None
See application file for complete search history.

(56) References Cited

U.S. PATENT DOCUMENTS

| 6,442,327 | B1 * | 8/2002 | Yamada et al. | 386/230 |
|---|---|---|---|---|
| 6,804,689 | B1 * | 10/2004 | Havrda et al. | 707/661 |
| 6,845,182 | B2 | 1/2005 | Matsuo | |
| 2002/0003941 | A1 * | 1/2002 | Hatae et al. | 386/46 |
| 2002/0124256 | A1 | 9/2002 | Suzuka | |
| 2002/0172496 | A1 * | 11/2002 | Gunji et al. | 386/46 |
| 2003/0223140 | A1 | 12/2003 | Kobata et al. | |
| 2004/0013060 | A1 | 1/2004 | Ito | |
| 2004/0156615 | A1 * | 8/2004 | Funazaki | 386/46 |
| 2004/0228614 | A1 * | 11/2004 | Yokoyama et al. | 386/69 |
| 2005/0069284 | A1 * | 3/2005 | Tanabe et al. | 386/46 |
| 2005/0237396 | A1 | 10/2005 | Hagiwara et al. | |
| 2006/0109754 | A1 * | 5/2006 | Iijima | 369/30.01 |
| 2006/0244846 | A1 * | 11/2006 | Misawa | 348/231.7 |
| 2006/0263036 | A1 * | 11/2006 | Marumori | 386/46 |

FOREIGN PATENT DOCUMENTS

| JP | 11-112919 | 4/1999 |
|---|---|---|
| JP | 11-328937 | 11/1999 |
| JP | 2001-016490 | 1/2001 |
| JP | 2001-157162 | 6/2001 |
| JP | 2001-313878 | 11/2001 |

(Continued)

OTHER PUBLICATIONS

JP Office Action for Japanese Application No. 2010-208755, issued on Sep. 4, 2012.

(Continued)

*Primary Examiner* — William C Vaughn, Jr.
*Assistant Examiner* — Eileen Adams
(74) *Attorney, Agent, or Firm* — Antonelli, Terry, Stout & Kraus, LLP.

(57) ABSTRACT

An object of the present invention is to display, during data recording, the number of recording media that are required to store all of recorded data in the case where the recorded data is copied to the recording media, and to display a ratio of a recorded area to the capacity of the recording medium to which data is copied, and thereby to provide improved convenience. The capacity of a large-capacity recording medium such as a hard disk is divided into data fragments each of which is equivalent to the capacity of a small-capacity recording media such as an optical disc, so that data is recorded on a partition capacity basis. In addition, the number of used media each having the same amount as the partition capacity is displayed; and the amount of recorded data, or the remaining recordable capacity, based on the partition capacity, is also displayed.

4 Claims, 6 Drawing Sheets

(56) References Cited

FOREIGN PATENT DOCUMENTS

| | | |
|---|---|---|
| JP | 2002-109870 | 4/2002 |
| JP | 2002-152642 | 5/2002 |
| JP | 2002-245717 | 8/2002 |
| JP | 2003-109300 | 4/2003 |
| JP | 2003-244613 | 8/2003 |
| JP | 2003-272346 | 9/2003 |
| JP | 2004-005855 | 1/2004 |
| JP | 2004-055010 | 2/2004 |
| JP | 2004-080507 | 3/2004 |
| JP | 2004-274449 | 9/2004 |
| JP | 2005-005841 | 1/2005 |
| JP | 2005-085359 | 3/2005 |
| JP | 2005-182864 | 7/2005 |
| JP | 2005-182931 | 7/2005 |
| JP | 2005-276273 | 10/2005 |
| JP | 2005-276389 | 10/2005 |
| JP | 2005-318125 | 11/2005 |
| JP | 2006-221697 | 8/2006 |

OTHER PUBLICATIONS

JP Office Action for Japanese Application No. 2012-23840, issued on Jun. 25, 2013.

* cited by examiner

VIDEO/AUDIO RECORDING AND REPRODUCING APPARATUS

PRIORITY/INCORPORATION BY REFERENCE

This application claims priority from Japanese Patent Application No.: P2006-252036, filed 19 Sep. 2006, the entire contents of which are incorporated by reference.

BACKGROUND OF THE INVENTION

1. Technical Field

The present invention relates to a recording and reproducing apparatus that is capable of recording/reproducing video/audio data to/from a recording medium.

2. Background Art

In recent years, video/audio recording and reproducing apparatuses have been widely used, each of which has an optical disc such as a DVD-RAM or a recording medium such as a hard disk. The storage capacity of recording media has been increasing, which allows for long time recording of video/audio data.

In general, the storage capacity of optical discs is smaller than that of hard disks. Since the unit price of optical discs, however, is low compared with hard disks, and optical discs are replaceable, optical discs are suitable for data backup.

On the other hand, although the storage capacity of hard disks is larger than that of optical discs, hard disks are not replaceable in many cases. Therefore, if the recording area of a hard disk is full of data, no further recording can be made. As a result, it is necessary to copy data to another recording medium.

For the above reasons, when video/audio data is copied from a hard disk to an optical disc, or the like, if the amount of data to be copied, which is stored in the hard disk, is larger than the storage capacity of the optical disc, the data is copied after performing the step of: dividing the data into data fragments, each of which has the data amount that is smaller than or equal to that of the optical disc; or decreasing a bit rate of the video/audio data so as to reduce the amount of data; or editing the data by a user to eliminate unnecessary video/audio data so that the amount of data is reduced.

According to Japanese Laid-Open Patent Publication No. 2003-244613, when long-time continuous recording is performed, video/audio data is divided into two or more parts before the video/audio data is recorded.

Japanese Laid-Open Patent Publication Nos. 2004-55010, 2005-182931, 2003-109300, 2005-276389, 2005-318125 disclose methods, and apparatuses, for dividing the storage capacity of a large-capacity recording medium such as a hard disk on the basis of the capacity of a small-capacity recording medium such as a DVD.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. In the drawings, same or corresponding portions may be referenced by the same or similar reference numerals in order to eliminate redundant explanation.

The following represents brief descriptions of the drawings, wherein.

DETAILED DESCRIPTION

Before beginning a detailed description of the subject invention, mention of the following is in order. When appropriate, like reference numerals and characters may be used to designate identical, corresponding or similar components in differing figure drawings. Further, in the detailed description to follow, example sizes/values/icons may be given, although the present invention is not limited to the same. Well known power/ground connections to ICs and other components may not be shown within the FIGS. for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. In other instances, detailed descriptions of well-known methods and components are omitted so as not to obscure the description of the invention with unnecessary/excessive detail. Multiple line (e.g., parallel) connections (including support components/circuitry) may be shown as a single line for simplicity of illustration and discussion, and so as not to obscure the invention. Arrowed or other interconnections shown between components may allow flow of information, etc. in a bidirectional manner. Where specific details (e.g., circuits, flowcharts) are set forth in order to describe example embodiments of the invention, it should be apparent to one skilled in the art that the invention can be practiced without, or with variation of, these specific details. Finally, it should be apparent that differing combinations of hard-wired circuitry and software instructions can be used to implement embodiments of the present invention, i.e., the present invention is not limited to any specific combination of hardware and software.

Although example embodiments of the present invention will be described using an example video camera environment using optical or memory card medium, practice of the invention is not limited thereto, i.e., the invention may be able to be practiced with other types of environments (e.g., set-top boxes) and media.

Turning now to description, as one problem to be solved by the invention, video/audio recording and reproducing apparatuses, which are capable of recording and reproducing video and audio data, have a function of displaying the amount of recorded data, or the remaining recordable capacity, based on the total capacity of a recording medium (for example, the recording time after the start of recording or the remaining recordable time). However, even if the function of displaying the amount of recorded data, or the remaining recordable capacity, based on the total capacity of a recording medium is used, when a user intends to copy recorded data to another (differing capacity/size) recording medium after recording is completed, the user cannot determine, during the recording, the number of recording media that are required to store all of the recorded data.

Moreover, when a user records video/audio data to a recording medium, the user can use a function of displaying the amount of recorded data (or the recording time spent for the recorded data), and the remaining recordable capacity (or the remaining recordable time), based on the total capacity of the recording medium. However, the user cannot view the number of optical discs, for example, that are required to store all of the video/audio data in a case where the video/audio data is copied to the optical discs from a higher capacity hard drive.

Therefore, one example object of the present invention is to provide a video/audio recording and reproducing apparatus capable of displaying, during recording, the required number of (smaller capacity/size) recording media to which the recorded data is copied, and a ratio of an amount of recorded data to the capacity of the recording medium to which the recorded data is copied, and thereby to provide the user with improved convenience.

An example video/audio recording and reproducing apparatus according to the present invention will be described with reference to drawings as below.

First Embodiment

Figure 1A:
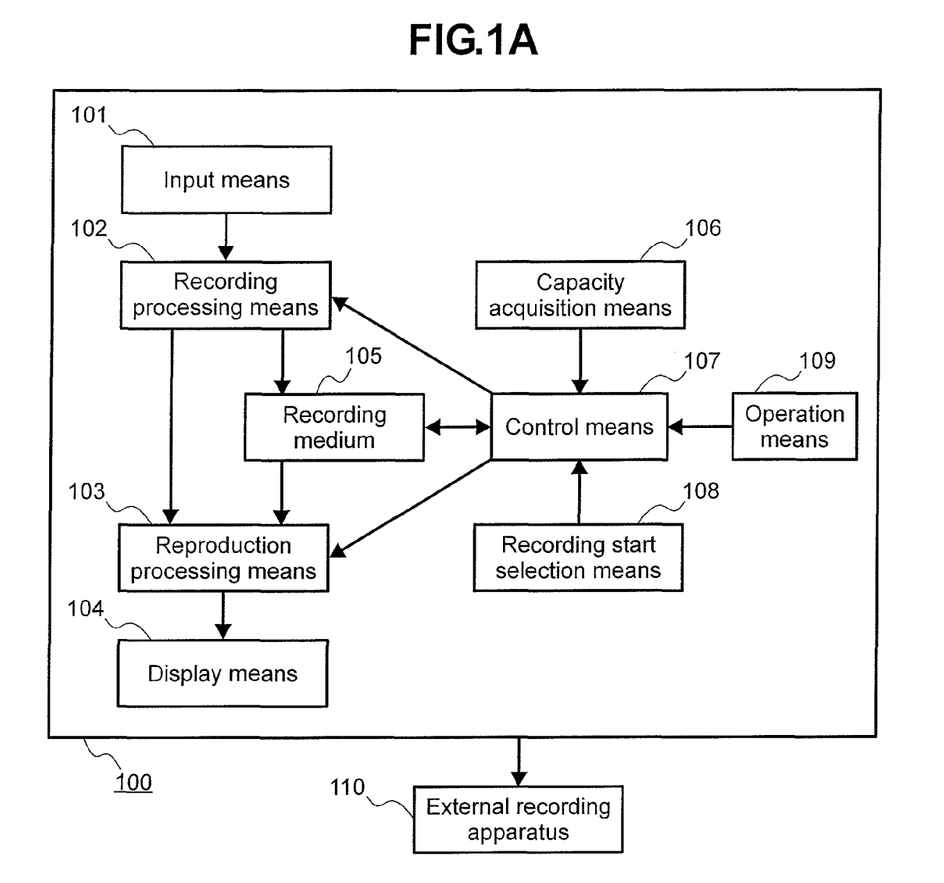
FIGS. 1A and 1B are diagrams illustrating an example overall configuration of a video/audio recording and reproducing apparatus according to a first example embodiment of the present invention.

FIG. 1A is a diagram illustrating an example overall configuration of a video/audio recording and reproducing apparatus 100 according to a first example embodiment of the present invention.

First of all, an example basic operation of the video/audio recording and reproducing apparatus will be described.

Input means 101 is formed of a lens, and an imaging element such as CCD (Charge Coupled Device), and CMOS (Complementary Metal Oxide Semiconductor). The input means 101 receives an inputted light beam as an electric signal to convert the light electric signal into a digital signal.

Recording processing means 102 compresses the converted digital signal, and performs other signal processing, and then writes data to a recording medium 105 (e.g., non-removable fixed medium). Here, a HDD (Hard Disk Drive) is used as the recording medium 105. The recording medium 105 also includes a buffer memory for temporarily storing data. In addition, the recording processing means 102 transmits the digital signal to reproduction processing means 103 so that the digital signal is converted into a signal which can be displayed on display means 104. As a result, the video acquired by the input means 101 is displayed on the display means 104. Moreover, the reproduction processing means 103 decompresses data that is recorded to the recording medium 105, and performs other signal processing, so that reproduced video is displayed on the display means 104.

Operation means 109 instructs operation including recording and reproducing of video data, and stopping. The operation is instructed through a button, a rotary switch, a touch panel, and the like. Information about the instructed operation is transmitted to control means 107. Then, the control means 107 controls the recording processing means 102 and the reproduction processing means 103 to execute the operation including recording and reproduction, and stopping.

Next, features of this example embodiment will be described.

Capacity acquisition means 106 acquires partition capacity into which the capacity of the HDD is virtually divided. The partition capacity is decided as the same capacity as that of an optical disc (e.g., removable medium) to which data is to be recorded by an external recording apparatus 110. The partition capacity may be set by a user, or may be automatically retrieved from information existent on the optical disc or other media which is loaded to the arrangement. The external recording apparatus 110 is, for example, a video recorder or an optical disc drive. For example, in the case of a DVD-RAM disk having a diameter of 12 cm, the single-side capacity is about 4.7 GB. If recording is performed in a mode in which the recording speed is about 6 Mbps on an average, it takes about 100 minutes to fill the disk with data. Therefore, a user sets the partition capacity to 4.7 GB, 100 minutes, or the like.

Figure 1B:
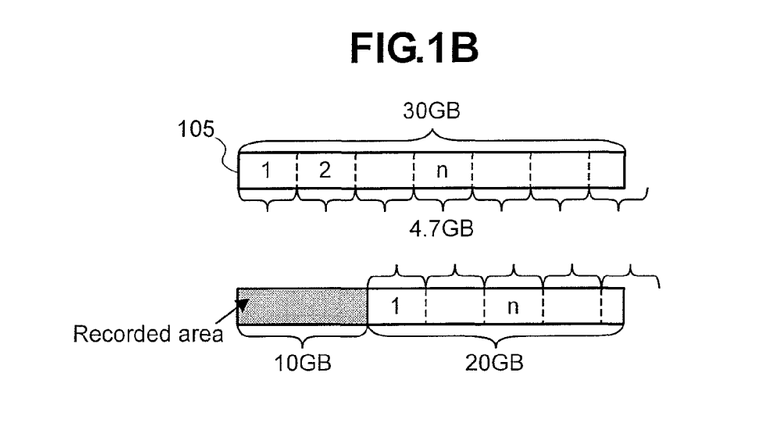

In addition, as shown in FIG. 1B, on the assumption that the total capacity of the HDD which is used as the recording medium 105 is 30 GB, if the amount of unused capacity is 30 GB (upper FIG. 1B), the number of partitions each having a partition capacity of 4.7 GB is seven at the maximum. If the amount of used capacity is 10 GB (lower FIG. 1B), the number of partitions each having a partition capacity of 4.7 GB, which are included in the remaining 20 GB, is five at the maximum. Incidentally, in the figure, the divided areas are numbered as follows: 1, 2, . . . , n, . . . .

When a start button for starting recording is pressed by using the operation means 109, the control means 107 instructs the recording processing means 102 to start recording. Data to be recorded is recorded to the recording medium 105. Accordingly, the amount of recorded data, which has been recorded to the recording medium 105, increases with the lapse of time. In addition, the control means 107 monitors the amount of data recorded to the recording medium 105. Then, when the amount of data reaches the partition capacity, the control means 107 divides the data recorded to the recording medium 105 by ending recording within a present partition, and continuing recording within another partition.

If a recording format is a VR (Video Recording) mode, the recorded data is divided into data fragments each having 4.7 GB, by storing, in a file having a file name of "VR_MAN-GR.IFO", for example, for managing a recorded data file having a file name of "VR_MOVIE.VRO", for example, management information including an address indicating the location at which the recorded data is divided. In this VR mode, the file "VR_MOVIE.VRO" forms one file from the viewpoint of a file structure. However, as a result of the management information included in the file "VR_MAN-GR.IFO", it looks on the user side as if the file "VR_MOV-IE.VRO" is divided into two or more files.

Moreover, if the division is performed on a file basis, the control means 107 instructs the recording processing means 102 to perform the division. However, in order to carry out continuous recording, imaged data is temporarily stored in a buffer memory included in the recording medium 105. During the storage of the data, a divided data file is generated; and after the completion of the division processing, the control means 107 transmits to the recording processing means 102 an instruction to restart the recording so that the recording is restarted. In this case, the data stored in the buffer memory is first recorded to the recording medium 105, and then video which is currently being imaged is recorded in real-time. For example, while a file having a file name of "000.avi" is recorded, when the recording processing means 102 receives a division instruction, a file whose file name is "001.avi" is created. Although the files "000.avi" and "001.avi" are different from each other, the video thereof is continuous therebetween.

As another example method, even if the amount of recorded data reaches the partition capacity, recording is continued. When a recording stop button is pressed by using the operation means 109, the recorded data is divided into data fragments on a partition capacity basis, so as to generate a plurality of data files.

Recording start selection means 108 selects a method for recording initiated by a user. When the stop of recording is selected by the operation means 109 during recording, the control means 107 instructs the recording processing means 102 to stop the recording. Subsequently, when the start of recording is selected by the operation means 109, a selection is made as to whether to restart the recording in a partition at which the video recording has been stopped, or to start new recording in the next partition of the partition at which the video recording has been stopped. In the VR mode, management information indicating continuous recording or new recording is written in the file "VR_MANGR.IFO", for example. In the method for generating divided files, in the case of new recording, even if the capacity of a file "002.avi" does not reach 4.7 GB, a new file "003.avi" is created to record data.

For example, when the remaining capacity of the HDD which is used as the recording medium 105 is 5.2 GB, the display means 104 displays 5.2 GB (=4.7 GB+0.5 GB) as the remaining recordable capacity. Similarly, while data is recorded to the recording medium 105, when recorded data reaches, for example, 5.2 GB based on the partition capacity, the display means 104 displays separate indications (e.g., icons, textual information) indicating 4.7 GB and 0.5 GB as the recorded capacity. Instead of the capacity, the time may also be displayed. In addition, the above-described capacity or time may also be displayed not only during recording, but also during reproducing data from the recording medium 105 or during copying or moving data from the recording medium 105 to the external recording apparatus 110. Moreover, although a user may instruct the displaying from the operation means 109, the above-described capacity or time may also be automatically displayed, for example, every time the partition capacity is reached.

Incidentally, in the present embodiment, the above description was made of the video/audio recording and reproducing apparatus that uses the HDD as the recording medium 105. However, the video/audio recording and reproducing apparatus may also use other types of media, as the recording medium 105, such as an optical disc such as a Blu-ray disc, or a flash memory such as a SD card (Secure Digital Memory Card). In addition, the present invention can also be applied to an audio recording and reproducing apparatus, which records/reproduces audio data, such as a voice recorder, instead of video data.

Second Embodiment

Figure 2:
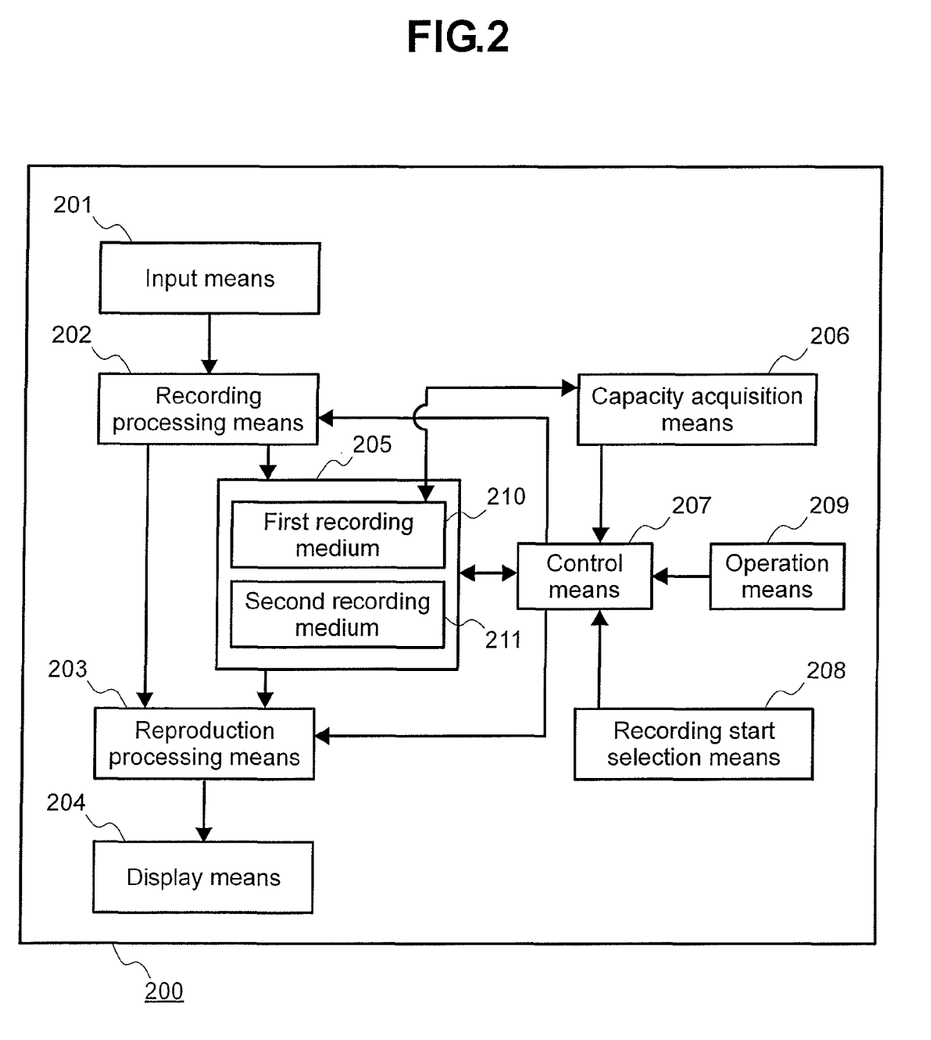
FIG. 2 is a diagram illustrating an example overall configuration of a video/audio recording and reproducing apparatus according to a second example embodiment of the present invention.

FIG. 2 is a diagram illustrating an example overall configuration of a video/audio recording and reproducing apparatus 200 according to a second example embodiment of the present invention.

The basic operations during recording and reproduction are the same as that described in the first embodiment. The video/audio recording and reproducing apparatus 200 includes input means 201, recording processing means 202, reproduction processing means 203, display means 204, a recording medium 205, capacity acquisition means 206, control means 207, recording start selection mean 208, and operation means 209.

The recording medium 205 includes first recording medium 210 and second recording medium 211. The first recording medium 210 is an example replaceable optical disc such as a DVD-RAM, whereas the second recording medium 211 is an example HDD that cannot be replaced by a user when the HDD is being used. The control means 207 controls a copy or movement of data from the second recording medium 211 to the first recording medium 210.

The capacity acquisition means 206 automatically acquires the capacity of an optical disc that is used as the first recording medium 210. For example, in the case of a DVD-RAM having a diameter of 8 cm, the capacity acquisition means 206 determines the capacity to be 1.4 GB. By reading out a specific code, or the like, included in the optical disc to identify a kind of disc such as a DVD-RAM disc and a Blue-ray disc, the capacity acquisition means 206 can acquire the capacity of the optical disc.

The capacity acquisition means 206 acquires the required number of optical discs that are necessary to copy the first recording media 210 by dividing an amount of data already recorded in the second recording medium 211 or the remaining recordable capacity thereof by the capacity of the optical disc used as the first recording medium 210.

Similarly to the display means 104 described in the first embodiment, during recording of data to the second recording medium 211, the display means 204 displays the amount of recorded data or the remaining recordable capacity based on the partition capacity of the first recording medium 210. In addition, also during reproducing of data from the second recording medium 211, and during copying or movement of data from the second recording medium 211 to the first recording medium 210, the display means 204 displays the amount of recorded data or the remaining recordable capacity.

Similarly to the first embodiment, the display means 204 displays the number of the first recording media 210, which are required to cover the remaining capacity of the second recording medium 211, or which are required to copy or move all of recorded data of the second recording medium 211 to the first recording medium 210.

Incidentally, the first recording medium 210 and the second recording medium 211 are not limited to optical discs or HDDs. Any kind of recording medium, which is capable of storing video and audio signals (for example, nonvolatile memories), may also be used.

Third Embodiment

Figure 3:
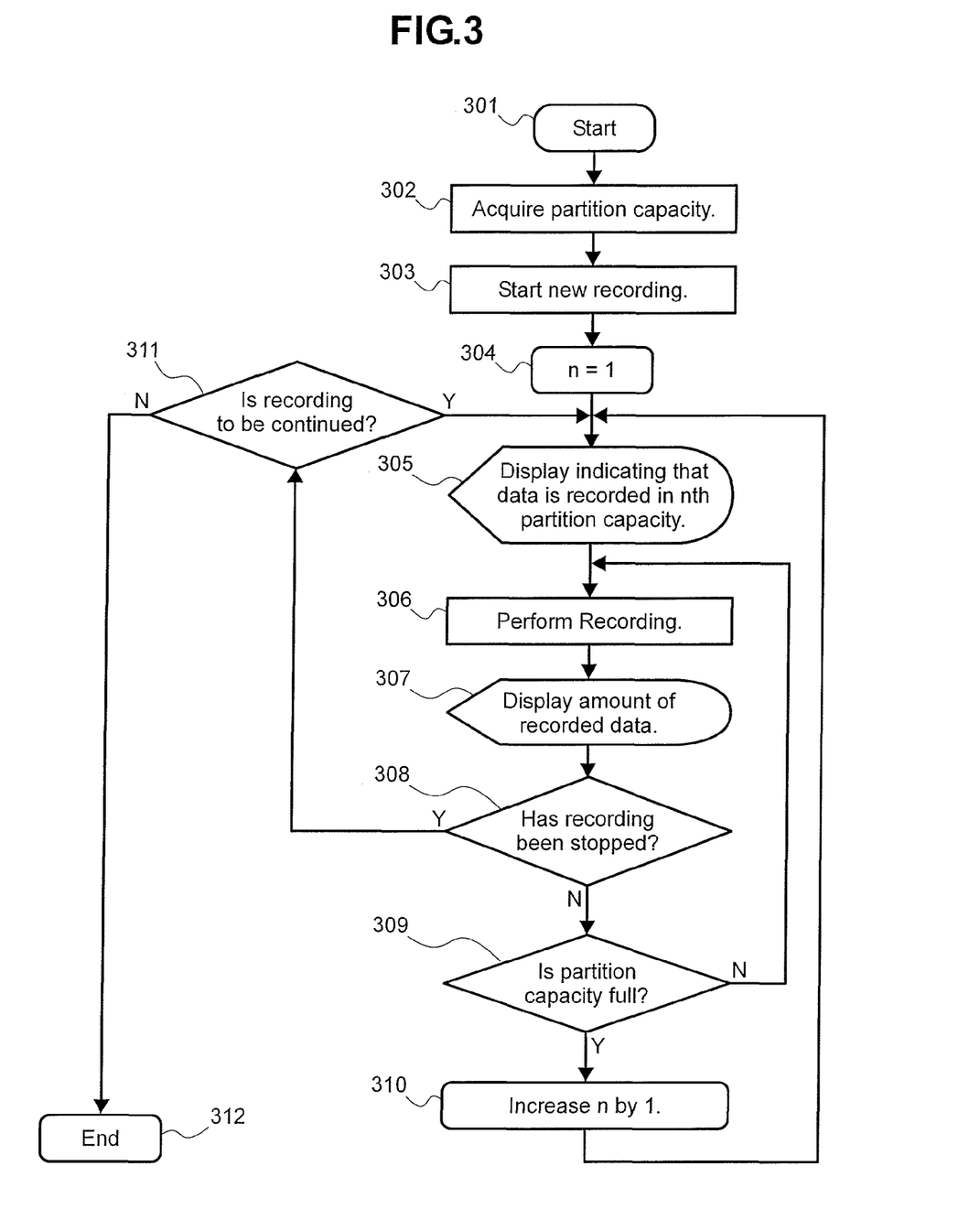
FIG. 3 is an example flowchart illustrating example steps of displaying information during recording operation of a video/audio recording and reproducing apparatus according to a third example embodiment of the present invention.

Steps of displaying information during recording operation of the video/audio recording and reproducing apparatus in the first and second embodiments will be described as a third example embodiment with reference to FIG. 3.

In a step 301, the operation is started. In a step 302, the partition capacity is acquired. In a step 303, new recording (in a partition not containing recorded data) is started. Then, in a step 304, a natural number n is initialized to 1. In a step 305, a message is displayed indicating that data is being recorded in an nth partition capacity. In a step 306, recording is performed. In a step 307, the amount of recorded data, or the remaining recordable capacity, based on the partition capacity is displayed. The recording time, the number of recorded bytes, or the like, is displayed as the amount of recorded data.

In a step 308, a determination is made as to whether or not the recording has been stopped. If it is determined that the recording has not been stopped, the process proceeds to a step 309 where a check is made as to whether or not the partition capacity is reached. If it is determined that the partition capacity is not reached, the process returns to the step 306. If it is determined in the step 309 that the partition capacity is reached, the process proceeds to a step 310 where the natural number n is increased by one. Then, the process returns to the step 305.

If it is determined in the step 308 that the recording has been stopped, the process proceeds to a step 311. In the step 311, a determination is made as to whether or not the recording is to be continued. If it is determined that the recording is to be continued, the recording is restarted from the step 305. If it is determined that the recording is not to be continued, the process proceeds to a step 312 where the process ends.

Incidentally, although displaying during recording was described here, only making a check as to whether or not the partition capacity has been reached suffices. Moreover, reproduction, copying, or movement of data may also be performed in the step 306.

The required number of optical discs of the external recording apparatus 110 is displayed. This is the number of optical discs required to cover the remaining capacity, or the amount of recorded data, of the recording medium 105 in the first embodiment. This displaying is the same as that of the first recording medium 210 and the second recording medium 211 in the second embodiment.

Fourth Embodiment

The display means 104 shown in FIG. 1, the display means 204 shown in FIG. 2, and the displaying performed in the step 307 in FIG. 3 will be described in example illustrations with reference to examples FIG. 4 through FIG. 6.

Figure 4A:
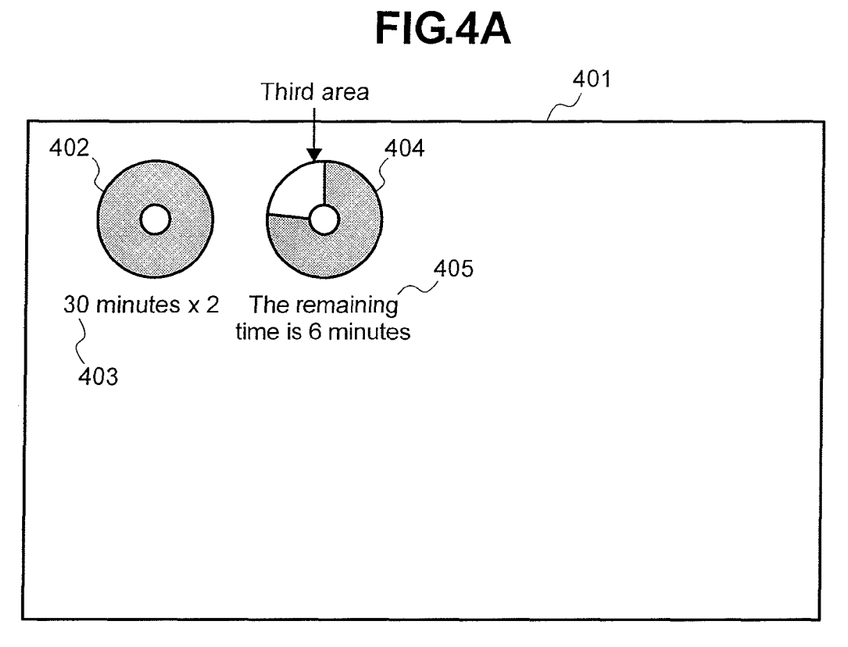
FIGS. 4A, 4B are example display screens, each displaying as an example, the amount of recorded data in the case of using an example optical disc according to the present invention.
Figure 4B:
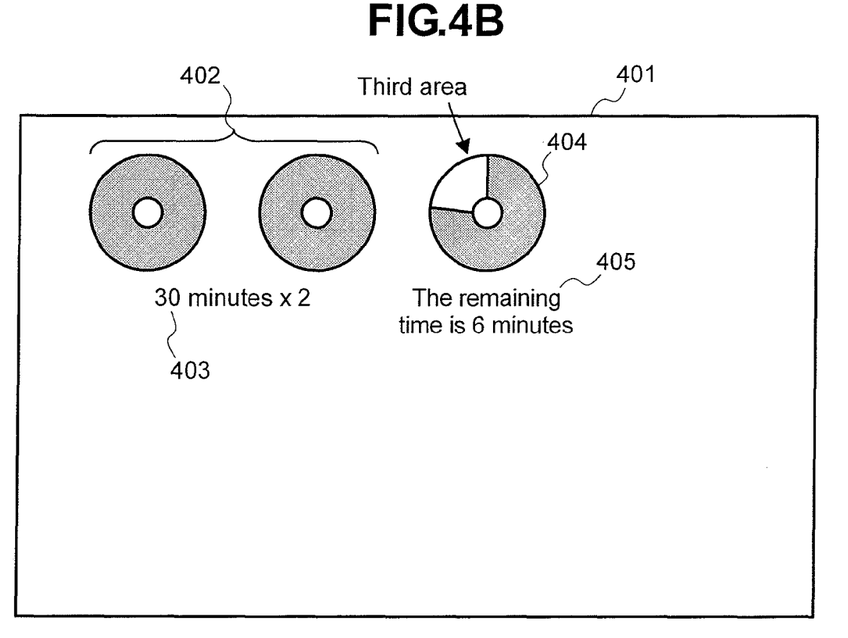

FIGS. 4A, 4B are example display screens each displaying the amount of recorded data based on the partition capacity by use of circle graphs (i.e., circular-shaped icons). Here, on the assumption that a DVD-RAM having a diameter of 8 cm is used, it takes 30 minutes to record data whose amount is 1.4 GB. A display screen 401 displays: an image 402 having a circle graphs completely shaded indicating that the amount of recorded data has already reached the partition capacity; characters 403 also indicating that the amount of recorded data has already reached the partition capacity; an image 404 having a circle graph partially shaded indicating that the amount of recorded data has not yet reached the partition capacity; and characters also indicating the remaining recordable time 405.

The image 402 indicates that the amount of recorded data that has reached the upper limit whose value is 1.4 GB, which is the partition capacity. FIG. 4A shows two circles, each of which corresponds to a separate unit of the partition capacity. FIG. 4B uses two circles to indicate that the number of discs on which the amount of recorded data has already reached the partition capacity is two. The characters 403 indicates the time required to fill up one disc with recorded data, and the number of discs on which the amount of recorded data has already reached the upper limit of a unit of the partition capacity. In this case, it is shown that the number of discs which are filled up with recorded data is two, and that each of the discs requires 30 minutes to fill up with the recorded data.

The image 404 graphically expresses a ratio of the amount, or a fractional-amount, of recorded data to the partition capacity. The ratio is visually expressed by an area ratio of a displayed pattern, or the like so that a recorded area and a recordable area can be easily and intuitively discriminated from each other by color, light and shade of color, a pattern, or the like. The remaining recordable time 405 indicates the recording time, and the remaining recordable time, based on the partition capacity.

FIG. 4B shows an alternative example display screen where the total recording time is 84 (=30×2+(30−6)) minutes, and that in a third area, the time of 6 minutes indicates the remaining recordable time.

Figure 5:
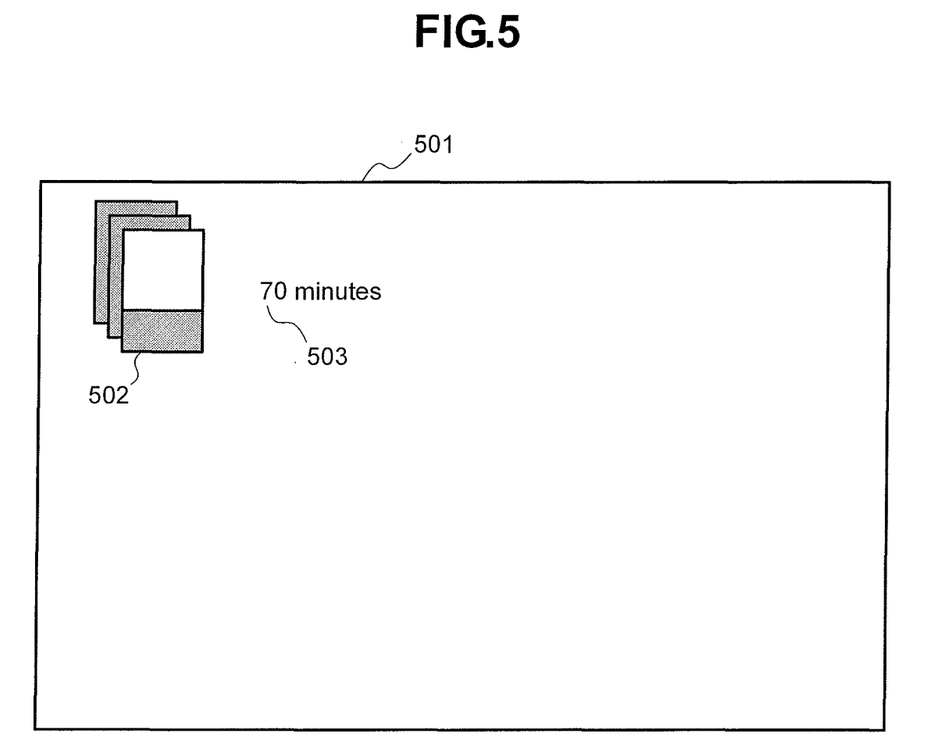
FIG. 5 is an example display screen displaying as an example the amount of recorded data in the case of using an example card-type recording medium according to the present invention.

FIG. 5 is an example display screen illustrating the amount of recorded data based on the partition capacity by use of rectangles, the partition capacity being based on the capacity of a card-type recording medium, for example. The display screen 501 displays an image 502 indicating the amount of recorded data, and characters 503 indicating the amount of recorded data. The image 502 indicates: the number of areas in which the amount of recorded data has already reached the upper limit, which is the partition capacity (see completely shaded rectangle icons); and a ratio of recorded data to the partition capacity of a partially used partition (see partially shaded rectangle icon). Each of the rectangles is superimposed with and is somewhat shifted from the other. The characters 503 indicate the recording time or can indicate the number of recorded bytes.

In the FIG. 5 example, the image 502 and the characters 503 show that on the assumption that the partition capacity is 30 minutes in terms of the recording time, two card-type recording media, each of which is capable of storing data whose amount is 30 minutes in terms of the recording time, have been used, and that data whose amount is 10 minutes has been recorded to a third card-type recording medium, and consequently the total amount of recorded data is 70 minutes in terms of the recording time.

Figure 6A:
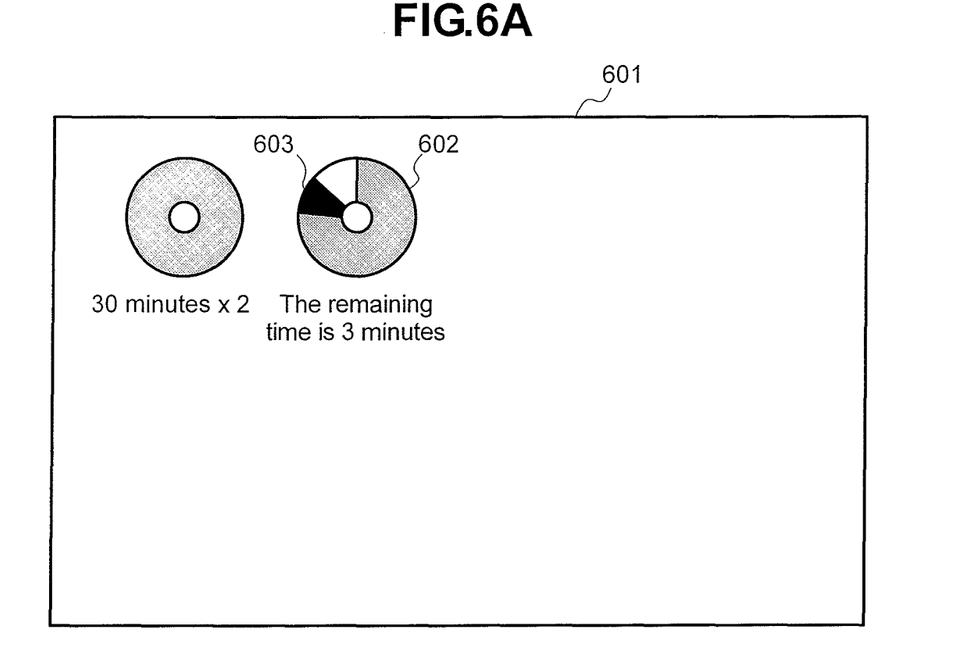
FIGS. 6A, 6B are example display screens, each displaying as an example, the amount of recorded data in the case of using an example optical disc according to the present invention.
Figure 6B:
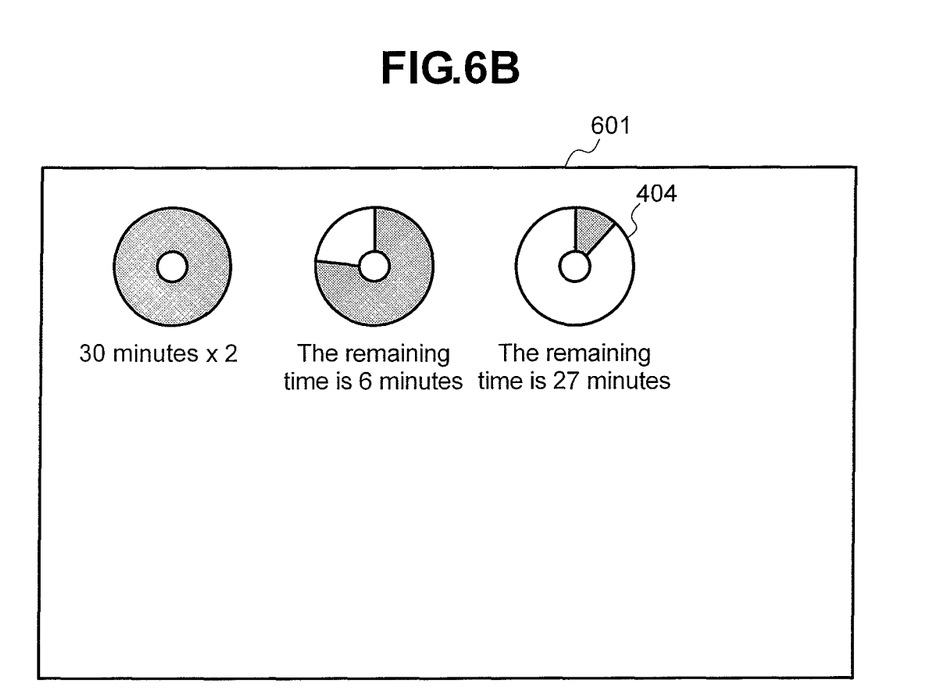

FIGS. 6A, 6B are example display screens each illustrating an example of a state after the start of recording is selected by the recording start selection mean 108 or 208. FIG. 6A illustrates an example state in which the recording shown in FIG. 4A is continued so that a continuous recording area 603 is added to a recorded area 602 on display means 601. As a result, it is shown that the remaining recordable time is three minutes.

FIG. 6B illustrates an example state in which after the recording shown in FIG. 4A, recording is next conducted in a partition not containing recorded data. On the display means 601, an image 404 indicating that the amount of recorded data has not yet reached the partition capacity is newly added. It is shown that since the recording has been newly performed for three minutes, the remaining recordable time is 27 minutes for the new partition.

Incidentally, the image 402 indicating that the amount of recorded data has already reached the partition capacity, the image 404 indicating that the amount of recorded data has not yet reached the partition capacity, and the image 502 indicating the amount of recorded data, need not always be shaped like a circle or a rectangle. They may also be shaped, for example, like an oval, or a rectangular parallelepiped; or they may also take the other shapes. In addition, the above-described images may be displayed not only during recording, but also during reproducing of recorded data and during copying or movement of recorded data.

According to the present invention, if recorded video/audio data is copied to media, it is possible to display, even during recording, the number of media that are required to store all of the recorded video/audio data, and the number of media that are required to cover the remaining capacity of a recording medium. Because the number of media is displayed by use of an image of the medium to which the recorded video/audio data is to be copied, a user can easily and intuitively understand (through visual clues such as the shaded icons) a state of the recording, which provides the user with increased convenience.

As a result of the present invention, when video/audio data is recorded, reproduced, or copied, the user is provided with increased convenience by being able to intuitively and easily comprehend information regarding the storage capacities/fullness of removable storage media used to copy or back-up the recorded data.

At least a portion (if not all) of the present invention may be practiced as a software invention, implemented in the form of one or more machine-readable medium having stored thereon at least one sequence of instructions that, when executed, causes a machine to effect operations with respect to the invention. With respect to the term "machine", such term should be construed broadly as encompassing all types of machines, e.g., a non-exhaustive listing including: computing machines, non-computing machines, communication machines, etc. With regard to the term "one or more machine-readable medium", the sequence of instructions may be embodied on and provided from a single medium, or alternatively, differing ones or portions of the instructions may be embodied on and provided from differing and/or distributed mediums. A "machine-readable medium" includes any mechanism that provides (i.e., stores and/or transmits) information in a form readable by a machine (e.g., a processor, computer, electronic device). Such "machine-readable medium" term should be broadly interpreted as encompassing a broad spectrum of mediums, e.g., a non-exhaustive listing including: electronic medium (read-only memories (ROM), random access memories (RAM), flash cards); magnetic medium (floppy disks, hard disks, magnetic tape, etc.); optical medium (CD-ROMs, DVD-ROMs, etc); electrical, optical, acoustical or other form of propagated signals (e.g., carrier waves, infrared signals, digital signals) embodied on a tangible carrier; etc In concluding, reference in the specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment or component, it is submitted that it is within the purview of one skilled in the art to effect such feature, structure, or characteristic in connection with other ones of the embodiments and/or components. Furthermore, for ease of understanding, certain method procedures may have been delineated as separate procedures; however, these separately delineated procedures should not be construed as necessarily order dependent in their performance, i.e., some procedures may be able to be performed in an alternative ordering, simultaneously, etc. Further, unless indicated otherwise, any of the specific procedures may be effected in real-time during operation of any apparatus and/or method.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A camera that picks up an image and records and reproduces an image data onto/from a recording medium, comprising:
    an imaging module which picks up an image data,
    a buffer memory which temporarily stores the image data,
    a recording unit which records the image data stored in the buffer memory onto the recording medium,
    a display unit which displays information,
    a control unit which controls the recording unit and the display unit so that, during the recording unit recording the image data onto the recording medium, the display unit displays information related to a remaining recordable time, wherein the remaining recordable time is based on a virtual partition of the recording medium and wherein the remaining recordable time is not related to an actual remaining capacity of the recording medium and wherein the remaining recordable time is not related to the buffer memory; and
    recording start selection unit which, when recording of the image data is restarted after the recording of the image data is stopped, selects either recording of data to an area not containing recorded data, or recording of data to an area containing recorded data, both of the areas being a partition of the recording medium, and allows selection of a continuation or a resetting of the remaining recordable time.

2. A camera that picks up an image and records and reproduces an image data onto/from a recording medium, comprising:
    an imaging module which picks up a moving image data,
    a buffer memory which temporarily stores the image data,
    a recording unit which records the image data stored in the buffer memory onto the recording medium,
    a display unit which displays information,
    a control unit which controls the recording unit and the display unit so that,
    during the recording unit recording the image data onto the recording medium, the display unit displays information related to a remaining recordable time, wherein the remaining recordable time is based on a virtual partition of the recording medium and wherein the remaining recordable time is not related to an actual remaining capacity of the recording medium and wherein the remaining recordable time is not related to the buffer memory, and
    when the recording unit restarts the recording of the image data onto the recording medium after the recording of the image data onto the recording medium is stopped, the display unit displays information related to a new remaining recordable time, where the new remaining recordable time is based on a virtual partition of the recording medium, and wherein the new remaining recordable time is not related to the actual remaining capacity of the recording medium and wherein the new remaining recordable time is not related to the buffer memory.

3. A camera according to claim 2, wherein:
    when the recording unit restarts the recording of the image data onto the recording medium after the recording of the image data onto the recording medium is stopped, the control unit comprises a first control regulation, the display unit displaying information related to the remaining recordable time which is based on a virtual partition of the recording medium, and which is continued from the remaining recordable time displayed before the recording stopped, and a second control regulation, the display unit displaying information related to the new remaining recordable time, wherein the new remaining recordable time is based on a virtual partition of the recording medium and wherein the new remaining recordable time is not related to an actual remaining capacity of the recording medium and wherein the new remaining recordable time is not related to the buffer memory.

4. A camera to capture an image and record the captured image to an internal recording medium, comprising:

an imaging module which captures a moving image data, a buffer memory which temporarily stores the moving image data, a recording module which records the captured moving image data stored in the buffer memory to the internal recording medium, an input module which receives a user operation, a display module which displays an image to be captured by the imaging module and an information related to a remaining recordable time, wherein the remaining recordable time is based on a virtual partition of the internal recording medium and wherein the remaining recordable time is not related to an actual remaining capacity of the internal recording medium and wherein the remaining recordable time is not related to the buffer memory, and wherein:

when the input module receives a first user operation, the display module displays simultaneously the image to be captured by the imaging module and the information related to the remaining recordable time which is based on a virtual partition of the internal recording medium in one screen, during recording the moving image data into the internal recording medium, when the input module receives a second user operation, the recording module stops recording the captured moving image data.

* * * * *